May 20, 1930. C. A. FRIEDLANDER 1,759,550
SPRING CATCH
Filed June 4, 1928
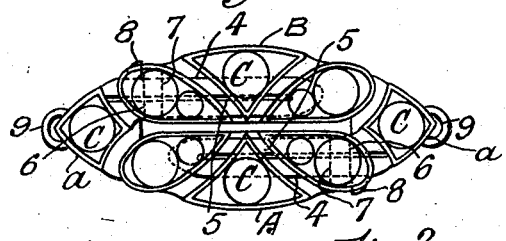
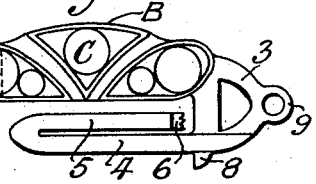
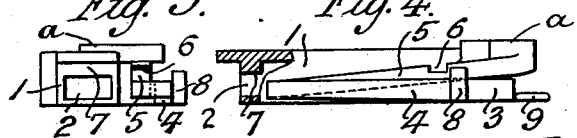
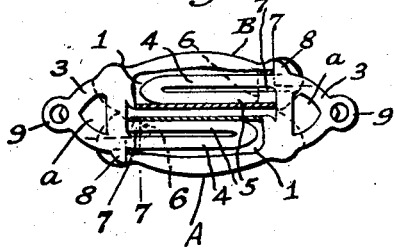
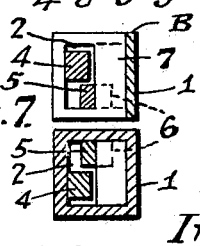
Inventor:
Cecil Assur Friedlander
By His Attorneys,
Baldwin & Slight Patented May 20, 1930

1,759,550

UNITED STATES PATENT OFFICE

CECIL ASSUR FRIEDLANDER, OF LONDON, ENGLAND, ASSIGNOR TO CECIL ASSUR BYWORTH & COMPANY, OF LONDON, ENGLAND

SPRING CATCH

Application filed June 4, 1928, Serial No. 282,773, and in Great Britain, July 12, 1927.

This invention relates to improvements in spring catches of the spring tongue and socket type especially suitable for fastening necklaces, bracelets and known generally as a snap fastening.

In the use of snap fastenings of this type it has hitherto been found necessary to provide a safety chain or catch in case the spring tongue should fail. This has involved two distinct actions upon the part of the wearer or user, that in connection with the safety chain or catch always having been of a finicky or troublesome nature and which it is the object of this invention to overcome by dispensing entirely with the necessity of it.

According to this invention, the fastening comprises a plurality of spring tongue-and-socket elements, each of which elements is separately formed and has an independent action, the spring tongue thereof being constructed to act upon the opposite walls of its socket so that in the event locking action of one element should fail, the operation of the remaining element or elements is unaffected so that the same will remain in locked position. Accordingly, in such a construction, each element acts as a separate fastening to avoid the necessity of providing a safety chain or the like.

Preferably the two parts of the fastening are each formed with a spring tongue and a socket, the spring tongue and the socket on one part being adapted when in the closed position to mate with the corresponding socket and spring tongue on the other part.

The invention is illustrated in the accompanying drawings in which Figure 1 is a plan of a snap fastening (in the locked position) constructed in accordance with the preferred form of the invention and for use with a necklace. Figures 2 and 3 are similar views showing the two parts of the fastening in the unlocked position, Figure 3 being partly broken away to disclose the construction.

Figures 4 and 5 are respectively a side and end elevation of the part shown in Figure 3. Figure 6 is an inverted plan view of the invention with the parts in the position shown in Figure 1, and Figure 7 is a sectional view taken on the line 7—7 of Figure 6. The drawings show the fastening to a greatly enlarged scale.

In the drawings, mating sections A and B constitute the fastening or spring catch and are shown separated in Figures 3 and 4 and as fastened together in Figures 1 and 6.

Each section has an elongated tubular member or socket 1 provided with an open end 2 in which a projection or shoulder 7 is formed. From the other or closed end of each tubular member 1, extends an open plate or head 3 which carries a tongue 4 arranged parallel to the tubular portion and adapted to be inserted into the companion tubular portion. Each tongue 4 has a locking member or arm 5 which is inclined upwardly and outwardly as specifically appears in Figures 4 and 5 and at its upper or free end, has a manipulating head $a$ thereon whereby it may be depressed. Each arm 5 is resilient and in its upper surface has a notch 6 adapted for locking engagement with projection 7.

The normal position of tongue 4 and arm 5 of each section is shown in Figure 4. Presuming such tongue and arm to be inserted into the companion member 1 through opening 2, it will be realized that the upper surface of arm 5 because it is inclined, will engage and be depressed by projection 7 and the notch 6 will clip into locking engagement with said projection 7. When it is desired to detach the sections, the portions $a$ are depressed, thus springing the arms 5 nearer the planes of the tongues 4 and causing notches 6 to disengage the projections 7, whereupon the sections A and B may be readily pulled apart.

The different parts may be suitably ornamented and particularly the tubular members 1 and heads $a$ as shown. The circles C suggest settings for precious stones.

Stops 8 are formed on the stems 4 to limit the closing movement of the fastening by engaging with the ends of the tubular members or sockets. 9 indicate ring holes for attachment to the ends of the necklace and in one with the heads 3. The two parts of the fastening illustrated it will be observed are identical with one another but of course such would not necessarily be the case if each were formed with more than one spring tongue and socket element.

It is clear that any desired number of spring tongues and sockets may be formed on each part and that they may be arranged in any desired manner provided the spring tongues on each part have their corresponding sockets on the other part of the fastening. Alternatively the spring tongues may all be formed on the one part and the sockets on the other part.

What I claim is:—

1. A catch of the class described comprising two separable elements, each element formed with a socket and tongue, the tongue of each element interlocking with the corresponding socket of the other element, the end of the tongue of one element when in locked position, being so spaced from the end of the tongue of the other element that the interlocking action of each tongue with the corresponding socket is independent of the other tongue.

2. A catch of the class described, comprising two separable elements, each element formed with a socket and tongue, each tongue having a resilient locking portion, the tongue and locking portion of each element engaging with the corresponding socket of the other element, the end of the tongue of one element when in locked position being so spaced from the end of the tongue of the other element that the interlocking action of each tongue with the corresponding socket is independent of the other tongue.

3. A catch of the class described comprising two separable elements, each element formed with a tongue and socket, each tongue having a resilient locking portion, the tongue and locking portion of each element engaging by snap action with the corresponding socket of the other element, the end of the tongue of one element when in locked position being so spaced from the end of the tongue of the other element that the interlocking action of each tongue with the corresponding socket is independent of the other tongue.

4. A catch of the class described comprising a plurality of elements, each element having a tongue provided with a resilient portion having a notch having walls disposed transversely of the tongue, said portion being inclined normally and when in locking position, and each element having a socket portion adapted to be entered and occupied by the tongues individually, each socket portion having a projection adapted to engage the inclined portion adjacent thereto and snap into the adjacent notch between the said walls thereof.

5. A catch of the class described, comprising a plurality of elements, each element having a tongue provided with a resilient inclined portion having a notch, each element having a socket portion adapted to be entered by the tongues, each socket portion having a projection adapted to engage the inclined portion adjacent thereto and snap into the adjacent notch, said tongues and socket members being offset so that each tongue aligns with a socket member, and each tongue having a stop to engage the adjacent socket to limit the fastening movement of the elements.

6. A two-part spring catch, each part comprising a spring tongue and a socket element, the spring tongue and socket element on one part being offset and the spring tongue and socket member on the other part being offset and reversed with respect to the corresponding members of the first part whereby each tongue aligns with a socket element, the spring tongue and socket on one part being adapted when the catch is closed, to mate with the corresponding socket and spring tongue on the other part.

7. A catch of the class described comprising two separable elements, each element having a socket and a tongue, the tongue of each element interlocking with the corresponding socket of the other element, said tongues being disposed for application to their sockets by movement in substantially parallel and non-intersecting paths whereby they will not contact with each other so that the interlocking action of each tongue with its corresponding socket will be independent of the other tongue and socket.

In testimony that I claim the foregoing as my invention I have signed my name this third day of May, 1928.

CECIL ASSUR FRIEDLANDER.